United States Patent [19]

Tsay

[11] 4,364,033

[45] Dec. 14, 1982

[54] ALARMING SEISMOMETER

[76] Inventor: Yun-Tyng Tsay, Taipei, Taiwan

[21] Appl. No.: 89,988

[22] Filed: Oct. 31, 1979

[51] Int. Cl.³ .............................................. G08B 21/00
[52] U.S. Cl. ..................................... 340/690; 73/654;
181/122; 340/540; 340/669
[58] Field of Search ............... 340/690, 669, 566, 540,
340/601; 181/122; 73/654, 652; 200/61.48

[56] References Cited

U.S. PATENT DOCUMENTS 3,813,505  5/1974  Shoji ...................................... 73/652
4,124,841 11/1978  Kettunen ............................. 340/690

*Primary Examiner*—Glen R. Swann, III
*Attorney, Agent, or Firm*—Berman, Aisenberg & Platt

[57] ABSTRACT

A small-sized, high sensitivity seismograph comprising a first seismometer for detecting left-right ground motions, a second seismometer for detecting up-down ground motions, two sets of protective device for preventing the seismographic detectors from damage due to excessive motions, an alarm system, and an adjustable device for adjusting the sensitivity of the alarm system. All of the above-described devices are provided in a case.

9 Claims, 1 Drawing Figure

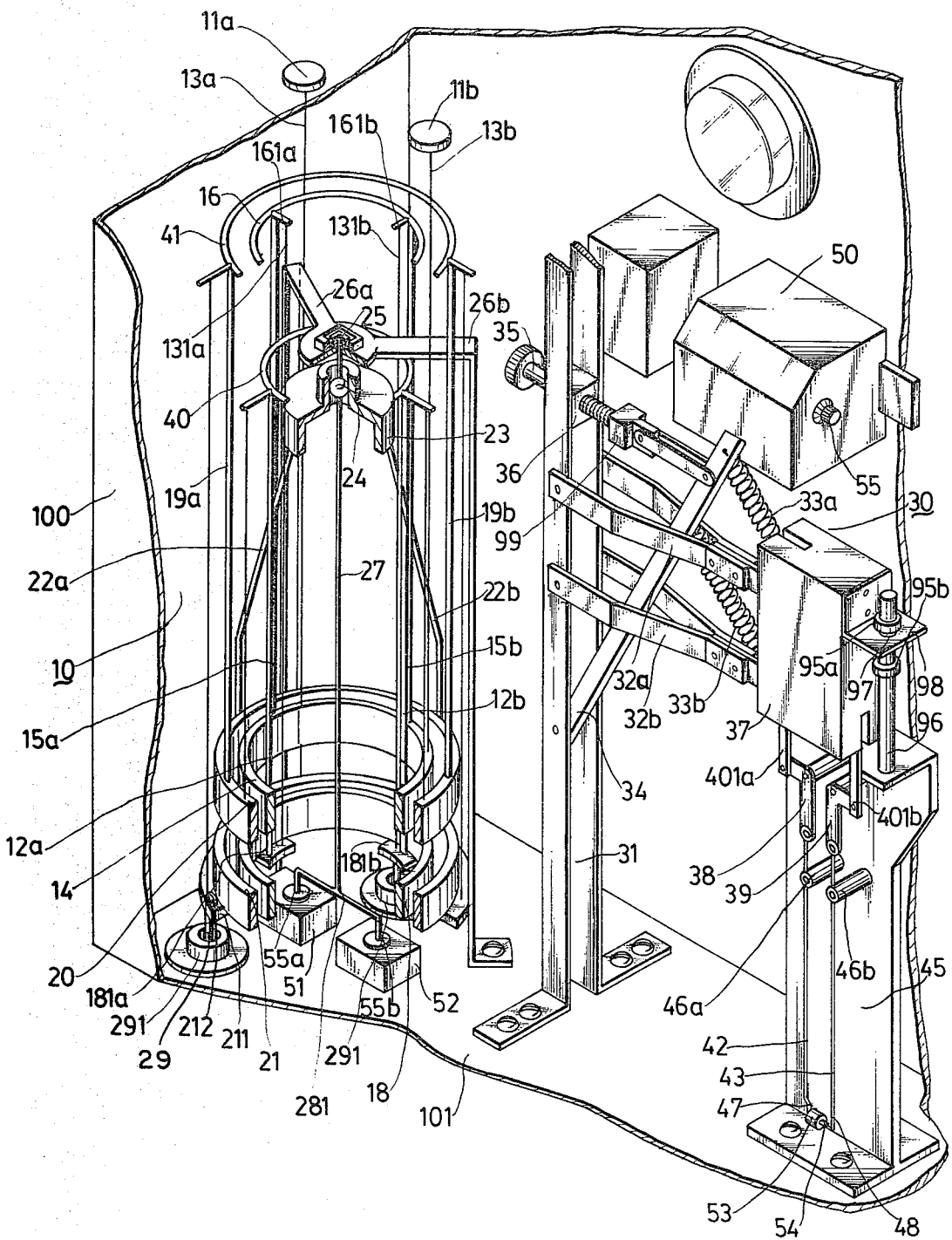

ALARMING SEISMOMETER

BACKGROUND OF THE INVENTION

1. Field of the Invention

This invention relates to a high sensitivity seismograph with an alarm system and particularly, to a small sized seismograph.

2. Description of the Prior Art

The conventional pendulum seismograph is provided a coil attached to the pendulum and a sensitive galvanometer connected to the coil. Motion of the coil in a magnetic field induces an electromotive force which activates the galvanometer and causes its movement. A mirror on the galvanometer deflects a light beam so as to produce record on photographic paper of seismic events. However, the conventional pendulum seismograph cannot measure simultaneously both the left-right motions and the up-down motions of the ground. Furthermore, in order to obtain sufficient magnification, it is difficult to reduce the size of the conventional seismograph significantly, thus, it is very inconvenient for transportation. In addition, conventional seismographs have not been provided with an alarm system, therefore, they cannot give out an early alarming signal before a serious earthquake occurs.

After considerable research work and experiments, it was discovered by the inventor that there are a series of ground motions which last for 2-3 minutes before a big earthquake. If people can make good use of the 2-3 minutes and take important steps, i.e., extinguishing the lights, cutting off electricity sources, getting out of high buildings, the damage brought forth by the earthquake will be reduced on a large scale. Furthermore, in an earthquake a speedy train is apt to leave the rail in a turn when there is a slight ground motion. If a seismograph of the present invention is placed along the rail, the locomotive engineer can slow down the train after he becomes aware of the alarm signal. In places like airports, dams, and the down stream areas of a dam, the damage caused by an earthquake will be reduced substantially if an auto-alarm seismograph has been placed in such a location.

SUMMARY OF THE INVENTION

It is therefore an object of the invention to provide a seismometer which can measure both left-right ground motions and up-down ground motions.

It is another object of the invention to provide an auto-alarm seismometer which can give out an alarm signal when the ground motions reach a certain degree of severity.

It is a further object of the invention to provide an auto-alarm seismometer wherein the sensitivity of the alarm system can be adjusted to a suitable value depending on where it is used.

It is still another object of the invention to provide a small-sized seismometer whose volume is significantly reduced so that it may be transported easily.

It is an even further object of the invention to provide a seismometer having a protective means therein so as to prevent the seismograph from being damaged by earth motions.

It is an additional object of the invention to provide a high sensitivity seismometer which may even record very weak ground motions.

The above and other objects and features of the invention will become apparent hereinafter from a consideration of the following description taken in connection with the accompanying drawing wherein a preferred embodiment is illustrated by way of example.

BRIEF DESCRIPTION OF THE DRAWING

The FIGURE is a partially cut away perspective view of the preferred embodiment in accordance with the invention.

DETAILED DESCRIPTION OF A PREFERRED EMBODIMENT

Referring to the FIGURE there is shown a rigid case 100 provided with a first seismomter 10 for detecting left-right ground motions and a second seismometer 30 for detecting up-down ground motions contained therein. The inner surface of the top of the rigid case 100 is provided with three anchor plates, two of which as shown as 11a and 11b each having equal-length resilient lines, two of which are shown as 13a and 13b, for connecting with a first inner pendulum 14. Two rigid supports 15a and 15b are mounted on the upper surface of the first inner pendulum 14 and positioned separately between any two adjacent resilient lines, two of which are shown as 13a and 13b. The upper end of the supports 15a and 15b are connected with a first horizontal annular support 16 having three protrusions, two of which are shown at 161a and 161b, spaced in an equal distance with each other. Each of the protrusions has a resilient line two of which are shown at 131a and 131b, connecting them respectively with flanges, two of which are shown at 181a and 181b, of a second inner pendulum 18 which is the same size of the first inner pendulum 14 and is located under the latter. Similar to what is described above on the flanges shown at 181a and 181b are provided with three rigid supports, two of which are shown as 12a and 12b for connecting with a second horizontal annular support 40 which is used to suspend a first outer pendulum 20 having a larger diameter than that of the inner pendulums 14 and 18. The first outer pendulum 20 is located at the same level with the first inner pendulum 14. Mounted on the upper surface of the first outer pendulum 20 are three rigid supports, two of which are shown at 19a and 19b for supporting a third horizontal annular support 41 which is used to suspend a second outer pendulum 21 located under the first outer pendulum 20 and kept at the same level with the second inner pendulum 18. On a flange 211 of the second outer pendulum 21, three bent rigid supports, two of which are shown as 22a and 22b, are provided for supporting a cylinder 23 positioned preferrably on the axis of the pendulums 14, 18, 20 and 21. A rotatable steel ball 24 having a through hole is mounted at the center of the cylinder 23. Above the cylinder 23 is a universal joint 25 secured by three brackets, two of which are shown at 26a and 26b, which are fixedly attached at the bottom 101 of the case 100. Upper portion of a detecting needle 27 is secured in the through hole of the steel ball 24 and protruded out of the steel ball 24 into a recess of the universal joint 25 so as to obtain a higher magnification when the cylinder 23 is moved by moving interlockingly the pendulums by an earthquake. The magnification is inversely proportional to the distance between the recess of the universal joint 25 and the steel ball 24. In other words, the shorter the distance, the higher the magnification. Thus, the detecting sensitivity of the first seismometer 10 is increased significantly by magnifying interlocking the motions of the pendulums and the needle as described above.

A rigid positioning rod 29 is inserted through a circular opening 212 provided on an outer flange of the pendulum 21 through an annular fixing plate 291 mounted on the bottom of the case 100 so as to prevent motion of the pendulums 14, 18, 20 and 21 from being over a suitable range that may damage the detecting needle 27. The lower end of the detecting needle 27 is connected with a horizontal conductive lever 281 having two disc type ends 55a and 55b each positioned near coils 51 and 52 respectively. Coils 51 and 52 are wound in a direction perpendicular to each other. Therefore, when the conductive bar 281 is moved by the detecting needle 27, a voltage will be induced on the coils 51 and 52 and rectified and magnified by circuits of an alarm system 50 so as to turn on a light or cause an alarm to sound for caution's sake. Perpendicular arrangement of the winding direction of the coils 51 and 52 is used to induce a sufficient voltage to actuate the alarm system 50, since it will induce a weak voltage or will not induce any voltage when the motion direction of the detecting needle 27 has a skew angle with or is parallel to the winding direction of the coils.

The vertical seismometer 30 includes a vertical support 31 whose upper end and lower end are fixed on the top and the bottom 101 of the case 100 respectively. Its two horizontal supports 32a and 32b are pivoted on the vertical support 31; a pendulum 37 mounted on the other end of the horizontal supports 32a and 32b; and two detecting needles 42 and 43 connecting with the pendulum 37. A recovering arm 34 is pivotally mounted on the vertical support 31 and has two springs 33a and 33b connected with the outer end of the horizontal supports 32a and 32b for keeping the supports 32a and 32b in a horizontal position in their normal condition. A threaded bolt 35 having screwed nut 36 is mounted on the vertical support 31 and protrudes out with the nut 36 engaging an adjustable securing device 99 pivotally connected to the upper portion of the recovering arm 34 so that the horizontal supports 32a and 32b can be adjusted to be maintained in a horizontal position by adjusting bolt 35. At the lower portion of the pendulum 37 mounted on the outer end of the horizontal supports 32a and 32b, are two connecting rods 401a and 401b, each pivoting with one end of an L-shape lever 38 and 39 at the lower end thereof. The corner portion of the L-shape levers 38 and 39 are pivoted on a fixing plate 45 fixed on the bottom 101 of the case 100 so that the lower end of the levers 38 and 39 will move inwardly or outwardly corresponding to the upward or downward motion of the pendulum 37 in an earthquake. Lower end of the levers 38 and 39 is connected with a detecting needle 42 and 43, respectively. Upper portion of the detecting needles 42 and 43 are pivotally attached to fixing plate 45 by two pivot members 46a and 46b so as to obtain a higher magnification of the motions of the detecting needles. Lower end 47 and 48 of the detecting needles are provided with a coil 53 and a core 54 respectively. Half of the core 54 is preferably positioned within the coil 53 under normal conditions. Thus, in an earthquake, by extension of the springs 33a and 33b and the inertial gravity of the pendulum 37, the pendulum 37 will generate up-down motions that make the coil 53 and the core 54 move inwardly and outwardly respectively, in opposite directions. A voltage induced by the opposite motions of the coil 53 and the core 54 will be amplified by circuits of an alarm system 50 to turn on a light or cause an alarming sound for caution. Furthermore, one side of the pendulum 37 is provided with a protruded plate 98 having an opening 97 thereon. A vertical protective bolt 96 having two adjustable nuts 95a and 95b thereon is fixed on the fixing plate 45 and protrudes through the opening 97 of the plate 98. One of the nuts 95a and 95b is provided above the plate 98, and the other is located under the plate 98 so that it can prevent the detecting needles 42 and 43 from being damaged due to over motions of the pendulum 37 by adjusting the distance between the nuts 95a and 95b.

In order to adapt the voltages induced in any direction by the horizontal seismometer 10 and the vertical seismometer 30, each of the coils is connected separately with the rectifying circuit prior to with a amplifying circuit of the alarm system 50. By such connection, the reverse voltages induced simultaneously by the seismometers 10 and 30 will not be opposed to each other. A knob 55 is connected with a variable resistance for adjusting the amplifying circuit to produce a bias, so that the sensitivity of the alarm system 50 can be controlled by turning the knob 55. For example, if the induced voltage acting as an input signal is not beyond the pre-adjusted bias, no alarm will be set off.

Since the circuits of the alarm system 50 are known to those skilled in the art, they will not be described hereinafter.

While there has been described a preferred form of the present invention, obviously modifications and variations are possible in light of the above teachings. It is therefore to be understood that within the scope of the appended claims, the invention may be practiced otherwise than as specifically described.

What is claimed is:

1. An alarming seismometer apparatus comprising:
   (a) a case having a plurality of supporting members therein, one of said supporting members being provided with a cylinder;
   (b) a first seismometer for detecting left-right ground motions secured by certain ones of said supporting members, said first seismometer including a plurality of annular pendulums connected interlockingly;
   (c) a steel ball contained within said cylinder;
   (d) said cylinder being connected with at least one pendulum of said plurality of pendulums;
   (e) a universal joint means connected to a second of said supporting members and located above said steel ball;
   (f) a detecting needle actuated by motions of said pendulums, the upper end of said detecting needle being inserted through said steel ball into a recess in said universal joint whereby a higher magnification of the motions of said detecting needle may be obtained if said pendulums are moved in an earthquake;
   (g) an electromagnetic means for producing a voltage by the motion of said detecting needle;
   (h) rectifying circuit connected with said electromagnetic means whereby motions of said detecting needle can be magnified interlockingly by said pendulums, in even a very brief earthquake;
   (i) a second seismometer, for detecting up and down ground motions, secured by a third of said support members;
   (j) an alarm system connected with said rectifying circuit; and
   (k) a means for adjusting the sensitivity of said alarm system.

2. An alarming seismometer apparatus as claimed in claim 1 wherein the lower end of said detecting needle is connected with a horizontal conductive bar whose ends approach and rotate over said electromagnetic means, said electromagnetic means constituting a plurality of electromagnetic means.

3. An alarming seismometer apparatus as claimed in claim 2, wherein said electromagnetic means is composed of two coils whose winding directions are perpendicular to each other.

4. An alarming seismometer apparatus as claimed in claim 1, 2 or 3, further comprises a protective means for preventing said detecting needle from being damaged due to over-motions of said pendulums.

5. An alarming seismometer apparatus as claimed in claim 1 or 3, wherein said second seismometer comprises two turnable arms pivoted on one of said supporting members, a recovering arm pivoted on said one supporting member having two springs respectively connected with said turnable arms, a pendulum connected with the other end of said arms having two downwardly protruding rods provided at the lower portion thereof, two L-shape levers whose upper ends are connected with the lower ends of said protruded rods respectively, two detecting needles connected to the lower ends of said L-shape levers respectively, an electromagnetic means mounted on the lower ends of said detecting needles, a rectifying circuit connected with said electromagnetic means and said alarm system, and a securing plate fixed on the bottom of said case, characterized in that the corner portions of said L-shape levers and the upper portions of said detecting needles are pivoted on said securing plate, whereby the lower end of said detecting needles will move inwardly or outwardly corresponding to the up-down motions of said pendulum in an earthquake.

6. An alarming seismometer apparatus as claimed in claim 5, wherein the upper end of said recovering arm is engaged with an adjustable device mounted on said one supporting member so as to keep the turntable arms in a horizontal position in the normal position.

7. An alarming seismometer apparatus as claimed in claim 5, wherein said electromagnetic means is composed of a coil and a core.

8. An alarming seismometer apparatus as claimed in claim 7, wherein half of said core is preferably positioned within said coil when it is in the normal condition.

9. An alarming seismometer apparatus as claimed in claim 8, wherein said apparatus contains a protective means for preventing said detecting needles from being damaged due to the over-motions of said pendulum.

* * * * *